(12) United States Patent
Chen et al.

(10) Patent No.: US 9,900,471 B2
(45) Date of Patent: Feb. 20, 2018

(54) IMAGE CORRECTION SYSTEM AND METHOD THEREOF

(71) Applicants: GLOBAL UNICHIP CORPORATION, Hsinchu (TW); TAIWAN SEMICONDUCTOR MANUFACTURING CO., LTD., Hsinchu (TW)

(72) Inventors: Chun-Hung Chen, Hsinchu County (TW); Cheng-Ta Lee, Hsinchu County (TW)

(73) Assignees: GLOBAL UNICHIP CORPORATION, Hsinchu (TW); TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 159 days.

(21) Appl. No.: 15/149,175

(22) Filed: May 8, 2016

(65) Prior Publication Data

US 2017/0150011 A1    May 25, 2017

(30) Foreign Application Priority Data

Nov. 23, 2015    (CN) .......................... 2015 1 0815762

(51) Int. Cl.
*G06F 9/00* (2006.01)
*H04N 1/60* (2006.01)
*G06K 9/62* (2006.01)

(52) U.S. Cl.
CPC ............. *H04N 1/60* (2013.01); *G06K 9/6202* (2013.01); *H04N 1/6086* (2013.01)

(58) Field of Classification Search
None
See application file for complete search history.

(56) References Cited

U.S. PATENT DOCUMENTS

| 7,305,126 B2* | 12/2007 | Hsieh ....................... H04N 1/60 |
| | | 345/604 |
| 2003/0090750 A1* | 5/2003 | Takahashi ............ H04N 1/6027 |
| | | 358/516 |
| 2006/0066912 A1* | 3/2006 | Kagaya ................ H04N 1/6086 |
| | | 358/302 |
| 2007/0065006 A1* | 3/2007 | Wilensky ............. H04N 1/6077 |
| | | 382/167 |

(Continued)

FOREIGN PATENT DOCUMENTS

TW    200627369    8/2006

*Primary Examiner* — Iman K Kholdebarin
(74) *Attorney, Agent, or Firm* — CKC & Partners Co., Ltd.

(57) ABSTRACT

An image correction system includes a storage device and a processor. The storage device is configured to store multiple reference patterns corresponding to different color temperatures. The processor is configured to execute operations of receiving an input image and correspondingly transforming the input image into multiple input gamut points; generating an input pattern according to distribution of the input gamut points, in which the input gamut points are surrounded by the input pattern; comparing the input pattern with the reference patterns to generate a comparison result; and estimating out a color temperature corresponding to the input image according to the comparison result so as to correct the input image.

20 Claims, 5 Drawing Sheets

(56) References Cited

U.S. PATENT DOCUMENTS

| | | | | |
|---|---|---|---|---|
| 2010/0020193 A1* | 1/2010 | Zhang | ............ | G06T 5/009 |
| | | | | 348/223.1 |
| 2010/0091196 A1* | 4/2010 | Tsai | ............ | H04N 9/67 |
| | | | | 348/645 |
| 2013/0016904 A1* | 1/2013 | Okutsu | ............ | H04N 9/735 |
| | | | | 382/167 |
| 2014/0232901 A1* | 8/2014 | Furuta | ............ | H04N 9/045 |
| | | | | 348/223.1 |
| 2015/0379594 A1* | 12/2015 | Sallee | ............ | G06Q 30/0283 |
| | | | | 705/412 |
| 2016/0021352 A1* | 1/2016 | Rudoy | ............ | H04N 9/735 |
| | | | | 348/223.1 |

* cited by examiner

IMAGE CORRECTION SYSTEM AND METHOD THEREOF

RELATED APPLICATIONS

This application claims priority to Chinese Application Serial Number 201510815762.1, filed Nov. 23, 2015, which is herein incorporated by reference.

BACKGROUND

Field of Invention

The present disclosure relates to an image processing system. More particularly, the present disclosure relates to an image correction system and a method thereof.

Description of Related Art

Current image correction systems select image correction modes according to the luminosity of illuminants, and the proportion of red light, green light and blue light among the illuminants. However, the current image correction systems have some defects. For example, when the illuminant exhibits a low color temperature (e.g., in the evening or on an overcast day), the current image correction systems may mistake an outdoor illuminant as an indoor illuminant, after which the current image correction systems may then execute wrong color compensation for an image. As a result, the image is not only recovered imperfectly, but distorted dramatically. To improve such a situation, an illuminant detecting circuit in the image correction systems can be modified, but the complexity for designing the image correction systems in this case is increased significantly.

Accordingly, a significant challenge is related to ways in which to recover an image perfectly awhile at the same time reducing the complexity associated with designing image correction systems.

SUMMARY

An aspect of the present disclosure is directed to an image correction system. The image correction system comprises a storage device and a processor. The storage device is configured to store multiple reference patterns corresponding to different color temperatures. The processor is configured to execute operations of receiving an input image and correspondingly transforming the input image into multiple input gamut points; generating an input pattern according to distribution of the input gamut points, in which the input gamut points are surrounded by the input pattern; comparing the input pattern with the reference patterns to generate a comparison result; and estimating out a color temperature corresponding to the input image according to the comparison result so as to correct the input image.

Another aspect of the present disclosure is directed to an image correction method. The image correction method comprises loading multiple reference patterns corresponding to different color temperatures in advance; receiving an input image and correspondingly transforming the input image into multiple input gamut points; generating an input pattern according to distribution of the input gamut points, in which the input gamut points are surrounded by the input pattern; comparing the input pattern with the reference patterns to generate a comparison result; and estimating out a color temperature corresponding to the input image according to the comparison result so as to correct the input image.

It is to be understood that the foregoing general description and the following detailed description are by examples, and are intended to provide further explanation of the invention as claimed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
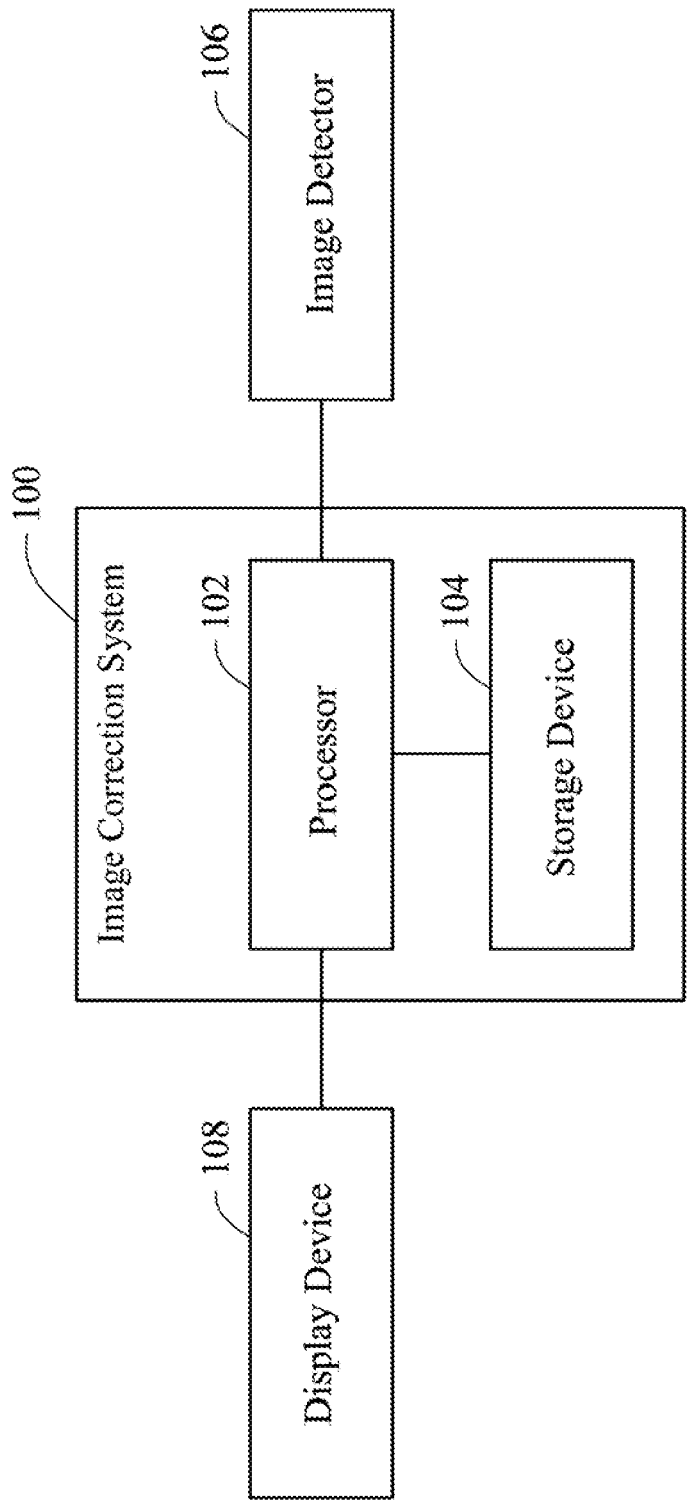
FIG. 1 is a block diagram of an image correction system according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

FIG. 1 is a block diagram of an image correction system according to some embodiments of the present disclosure. The image correction system 100 comprises a processor 102 and a storage device 104. The storage device 104 is connected to the processor 102, and the processor 102 is further connected to an image detector 106 and a display device 108.

For example, the image correction system 100 may be applied to a digital camera, a cellphone, a computer or any other electronic device. The processor 102 can be a central processing unit (CPU) or a graphics processing unit (GPU).

The storage device 104 can be a hard disk drive (HDD) or a memory. The image detector 106 can be a photosensitive member. The display device 108 can be a liquid crystal display (LCD), a light-emitting diode (LED) display or any other device which is able to display images.

The storage device 104 stores multiple reference patterns (e.g., the reference pattern 204 in FIG. 2), and each of the reference patterns corresponds to a color temperature. If the image detector 106 detects an input image, the image detector 106 transmits the input image to the processor 102. The display device 108 then receives and displays the input image which has been corrected by the processor 102.

Specifically, the processor 102 receives the input image from the image detector 106, and transforms the input image into multiple input gamut points (e.g., the input gamut point 206 in FIG. 2) by default transforming functions. The processor 102 generates an input pattern (e.g., the input pattern 202 in FIG. 2) corresponding to the input image according to distribution of the input gamut points, and the input gamut points are surrounded by the input pattern. Subsequently, the processor 102 compares the input pattern with each of the reference patterns stored in the storage device 104 to generate a comparison result. According to the comparison result, the processor 102 estimates a color temperature corresponding to the input image. Afterward, the processor 102 corrects the input image based on the estimated color temperature, and outputs the corrected input image to the display device 108. In one embodiment, the processor 102 corrects the input image based on the estimated color temperature. For example, the processor 102 performs white balance correction, color correction or any other image processing technique relating to color temperatures.

With respect to the comparison between the input pattern and the reference patterns mentioned above, in one embodiment, the processor 102 analyzes out intersection areas between the input pattern and the reference patterns, and then calculates out correlations between the input pattern and the reference patterns according to the number of the input gamut points located inside the intersection area and the number of the input gamut points located outside of the intersection area.

In one embodiment, a method for calculating out the correlations includes analyzing a ratio or a deviation between the number of the input gamut points located inside the intersection area and the number of the input gamut points located outside the intersection area, or any other relations relating to the number of the input gamut points; selecting out the reference pattern having the highest correlation with the input pattern from the reference patterns and a color temperature thereof to generate the comparison result; and estimating out the color temperature corresponding to the input image according to the comparison result.

Figure 2:
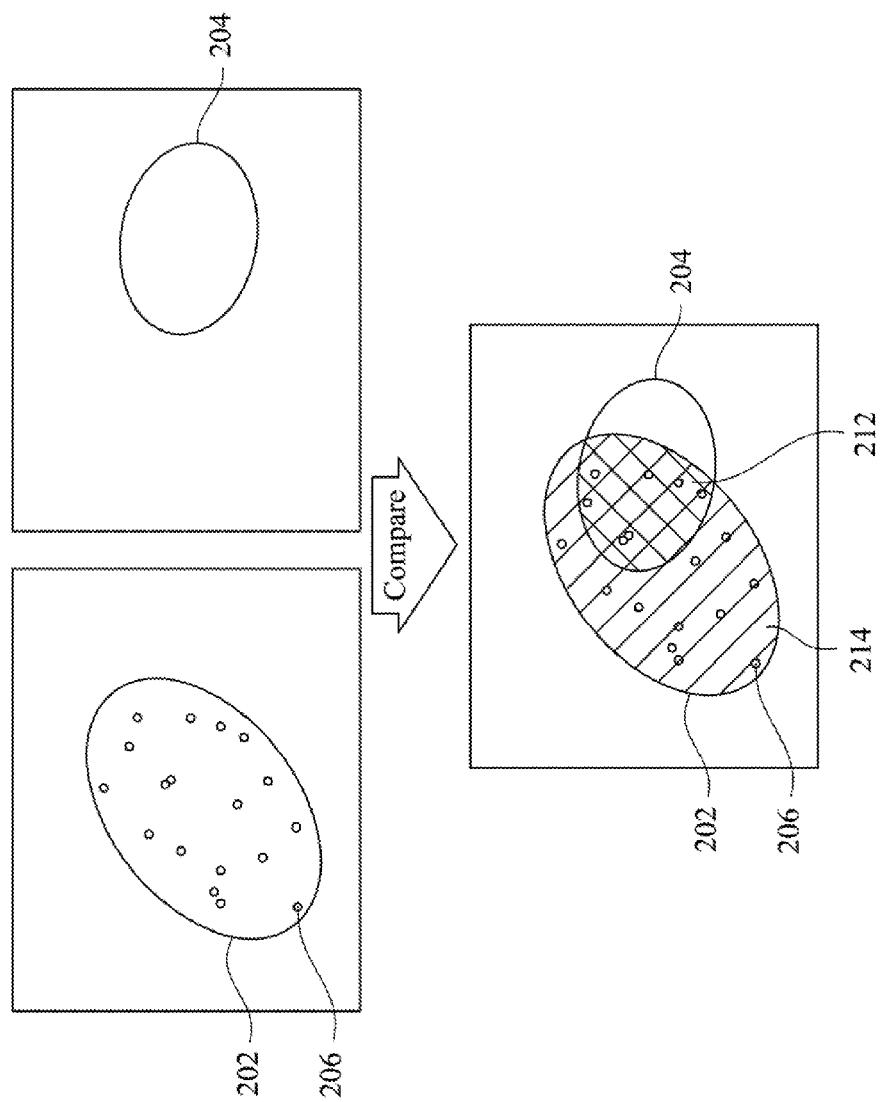
FIG. 2 is a schematic diagram of a comparison technique according to some embodiments of the present disclosure.

Reference is now made to FIG. 2. FIG. 2 is a schematic diagram of a comparison technique according to one embodiment of the present disclosure. The processor 102 in the image correction system 100 transforms the input image received from the image detector 106 into the input gamut points 206, and the input gamut points 206 are surrounded by the input pattern 202. Subsequently, the processor 102 compares the input pattern 202 with the reference patterns 204 stored in the storage device 104.

In one embodiment, the input pattern 202 and the reference patterns 204 can be ellipses. For illustration, when the input pattern 202 is displayed in the form of an ordinary precision, the processor 102 transforms the input image into the input gamut points 206 by functions as follows:

$$x = f_{R,Y}(R, R+G+B),$$

$$y = f_{B,Y}(B, R+G+B),$$

$$\hat{x} = x \cdot \cos\theta - y \cdot \sin\theta - u, \text{ and}$$

$$\hat{y} = x \cdot \sin\theta + y \cdot \cos\theta - v.$$

Each of the pixels has a pixel coordinate (R, G, B), in which R, G, and respectively denote their red, green, and blue components. In one embodiment, the processor 102 transforms the pixel coordinates (R, G, B) of the pixels of the input image by the functions $f_{R,Y}$ and $f_{B,Y}$ to generate multiple coordinates of gamut points (x, y). For example, x and y denote coordinates of a horizontal axis and a vertical axis of the gamut points respectively. The function $f_{R,Y}$ represents a function of the red component and a summation of the red component, the green component and the blue component, and the function of $f_{B,Y}$ represents a function of the blue component and the summation of the red component, the green component and the blue component.

To map the gamut points into a dimension where the reference patterns 204 are located to ease the comparison between the input pattern and the reference patterns, the processor 102 maps the gamut points into the input gamut points 206 by the above-mentioned functions $\hat{x}$ and $\hat{y}$ denote coordinates of a horizontal axis and a vertical axis of the input gamut points respectively. In one embodiment, ranges of parameters θ, u and v in the above-mentioned functions are as follows:

θ∈[−20, 11],
u∈[0, 15], and
v∈[0, 15].

Subsequently, the processor 102 generates the input pattern 202 as an ellipse by a function presented below, such that the input gamut point 206 is surrounded by the input pattern 202 to define an area for the input gamut points 206. This function is as follows:

$$(\hat{x}-u)^2/a^2 + (\hat{y}-v)^2/b^2 \le 1.$$

For illustration, ranges of parameters a and b in the above-mentioned function are as follows:

a∈[0, 7], and
b∈[0, 7].

Furthermore, when the input pattern 202 is displayed in the form of a higher precision and the input pattern 202 is an ellipse, for illustration, the ranges of the parameters θ, U, v, a and b are as follows:

θ∈[−20, 11],
u∈[0, 127],
v∈[0, 127],
a∈[0, 63], and
b∈[0, 63].

In one embodiment, excluding the transformation for the input image, the reference patterns 204 are also represented according to the parameters θ, u, v, a and b. Therefore, the number of bits adopted to store the reference patterns 204 can be calculated by the ranges of the parameters θ, u, v, a and b. If the input pattern 202 is displayed in the form of an ordinary precision, the ranges of the parameters u, v, a and b can be defined as θ∈[−20, 11], u∈[0, 15], v∈[0, 15], a∈[0, 7], and b∈[0, 7], so that the reference patterns 204 in the shape of ellipses are stored in the form of a data format having 19 bits (i.e., 5+4+4+3+3=19) in the storage device 104. If the input pattern 202 is displayed in the form of a higher precision, the ranges of the parameters ϵ, u, v, a and b can be defined as θ∈[−20, 11], u∈[0, 127], v∈[0, 127], a∈[0, 63], and b∈[0, 63], so that the reference patterns 204 in the shape of ellipses are stored in the form of a data format having 31 bits (i.e., 5+7+7+6+6=31) in the storage device 104. In one embodiment, for the input pattern 202 in the form of the ordinary precision, the reference patterns are stored in the data format having less bits than that of the input pattern 202 in the form of the higher precision, so as to accelerate the comparison between the input pattern 202 and the reference patterns. For the input pattern 202 in the form of the higher precision, the reference patterns are stored in the data format having more bits than that of the input pattern 202 in the form of the ordinary precision, so as to enhance the accuracy of the comparison between the input pattern 202 and the reference patterns. For the purpose of understanding and convenience, the ranges of the parameters disclosed above are by examples, and the present disclosure is not limited hereto.

In one embodiment, it is unnecessary to map the coordinates of the gamut points (x, y) into the dimensionality where the reference patterns 204 are located. In other words, the gamut points are able to be adopted as the input gamut points 206 to continue subsequent procedures for calibrating the input image.

Although the input pattern 202 and the reference patterns 204 are ellipses in FIG. 2, the present disclosure is not limited thereto. In another embodiment, the input pattern 202 surrounding the input gamut points 206 can be a circle. For illustration, when the input image is displayed in the form of the 16-by-16 pixels, the processor 102 transforms the input image into the input gamut points 206 by functions as follows:

$x = f_{R,Y}(R, R+G+B)$, $y = f_{B,Y}(B, R+G+B)$, $x' = c \cdot x$, $\hat{x} = x' \cdot \cos\theta - y \cdot \sin\theta - u$, and $\hat{y} = x' \cdot \sin\theta + y \cdot \cos\theta - v$.

Each of the pixels has the pixel coordinate (R, G, B), in which R, G, and B respectively denote their red, green, and blue components. x and y denote the coordinates of the horizontal axis and the vertical axis of the gamut points respectively. x' denotes a coordinate of the horizontal axis of the gamut points scaled by a scaling factor c. $\hat{x}$ and $\hat{y}$ denote the coordinates of the horizontal axis and the vertical axis of the input gamut points 206 respectively. A detailed description of parameters has been provided above, and so will not be repeated. For illustration, the ranges of the parameters $\theta$, u and v are as follows:

$\theta \in [-20, 11]$, $u \in [0, 15]$, and $v \in [0, 15]$.

Subsequently, the processor 102 generates the input pattern 202 in the shape of a circle by a function below, such that the input gamut point 206 is surrounded by the input pattern 202 to define the area for the input gamut points 206. This function is as follows:

$(\hat{x}-u)^2 + (\hat{y}-v)^2 \leq a^2$.

For illustration, the ranges of parameter a in the above-mentioned function is $a \in [0, 7]$. In one embodiment, the reference patterns 204 are represented by the parameters u, v and a. Therefore, when the input pattern 202 is displayed in the form of an ordinary precision, the ranges of the parameters u, v and a can be defined as $u \in [0, 15]$, $v \in [0, 15]$ and $a \in [0, 7]$, so that the reference patterns 204 in the shape of circles are stored in the form of a data format having 11 bits (i.e., 4+4+3=11) in the storage device 104. For the purpose of understanding and convenience, the ranges of the parameters disclosed above are by examples, and the present disclosure is not limited thereto.

In one embodiment, it is unnecessary to map the coordinates of the gamut points (x, y) into the dimensionality where the reference patterns 204 are located. In other words, the gamut points are able to be adopted as the input gamut points 206 to continue the subsequent procedures for calibrating the input image.

Subsequently, the processor 102 compares the input pattern 202 with the reference patterns 204 stored in the storage device 104. In one embodiment, the processor 102 analyzes out intersection areas between the input pattern and each of the reference patterns, and calculates out a correlation according to the number of the input gamut points located inside the intersection area and the number of the input gamut points located outside the intersection area. Therefore, the intersection area between the input pattern 202 and the reference pattern 204 is called a positive-response area 212, and an area of the input pattern 202 without intersecting with the reference pattern 204 is called a negative-response area 214.

Specifically, the processor 102 calculates out the correlations between the input pattern 202 and the reference patterns 204 according to a ratio or a deviation between the number of the input gamut points 206 located in the positive-response area 212 and the number of the input gamut points 206 located in the negative-response area 214 or any other relations relating to the number of the input gamut points 206. After the processor 102 calculates out the correlations, the processor 102 selects out the reference pattern 204 having the highest correlation with the input pattern 202 from the reference patterns 204 and the color temperature thereof to generate the comparison result. The processor 102 estimates out the color temperature corresponding to the input image according to the comparison result.

Figure 3:
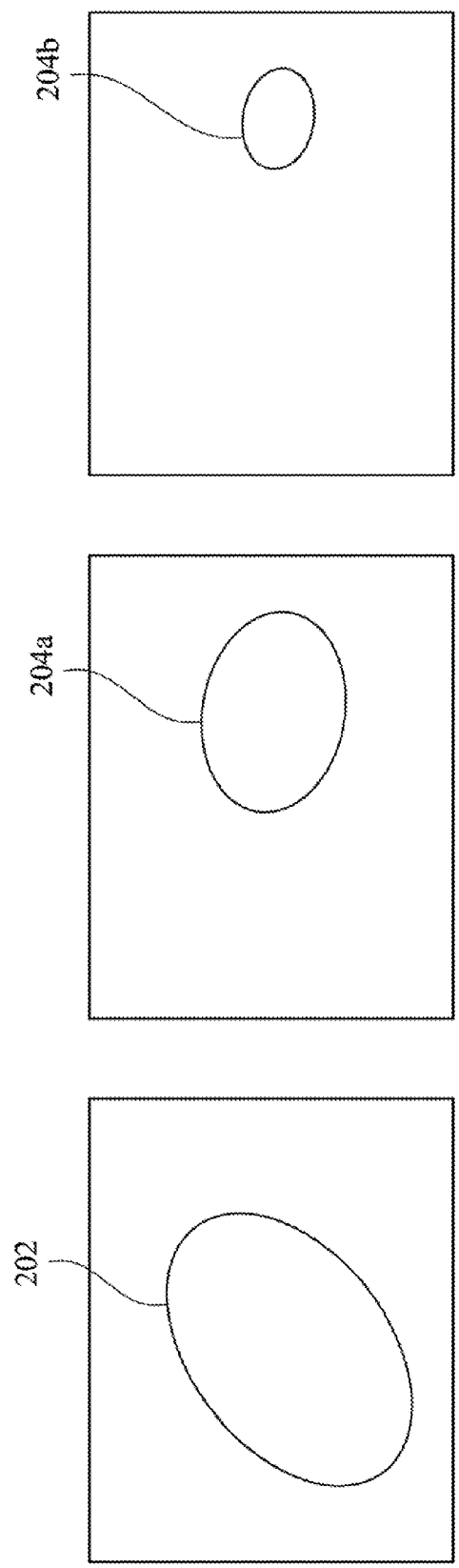
FIG. 3 is a schematic diagram of reference patterns of the image correction system according to some embodiments of the present disclosure.

Reference is now made to FIG. 3. FIG. 3 is a schematic diagram of reference patterns of the image correction system according to some embodiments of the present disclosure. As shown in FIG. 3, there are differences between the area of the input pattern 202 and areas of a reference pattern 204*a* and a reference pattern 204*b*. In one embodiment, when the difference between the area of the reference pattern 204*a* and the area of the input pattern 202 is lower than a default difference threshold, it is necessary to further calculate out the correlation between the reference pattern 204*a* and the input pattern 202 due to the insignificant difference between the reference pattern 204*a* and the input pattern 202. On the other hand, when the difference between the area of the reference pattern 204*b* and the area of the input pattern 202 is higher than the default difference threshold, it is unnecessary to further calculate out the correlation between the reference pattern 204*b* and the input pattern 202 due to the significant difference between the reference pattern 204*b* and the input pattern 202. For instance, the default difference threshold may be a default parameter in the image correction system 100. In one embodiment, the image correction system 100 can dynamically modify the default difference threshold according to a variation between an indoor illuminant and an outdoor illuminant.

In one embodiment, the processor 102 is configured to select out a group of candidate reference patterns from the storage device 104 in advance, and the differences between areas of each of the reference patterns 204*a* in the group of the candidate reference patterns and the area of the input pattern 202 are lower than the default difference threshold. After the processor 102 selects out the group of the candidate reference patterns, the reference patterns 204b having the higher differences from the area of the input pattern 202 are therefore filtered. Next, the processor 102 calculates out the correlations between the input pattern 202 and the reference patterns 204a in the group of the candidate reference patterns to generate the comparison result. In contrast, the processor 102 does not calculate out the correlations between the input pattern 202 and the reference patterns out of the group of the candidate reference patterns (i.e., the reference patterns 204b) to accelerate the correlation calculation between the input pattern 202 and the reference patterns 204. A detailed description of the correlation calculation has been provided above, and so will not be repeated.

Figure 4:
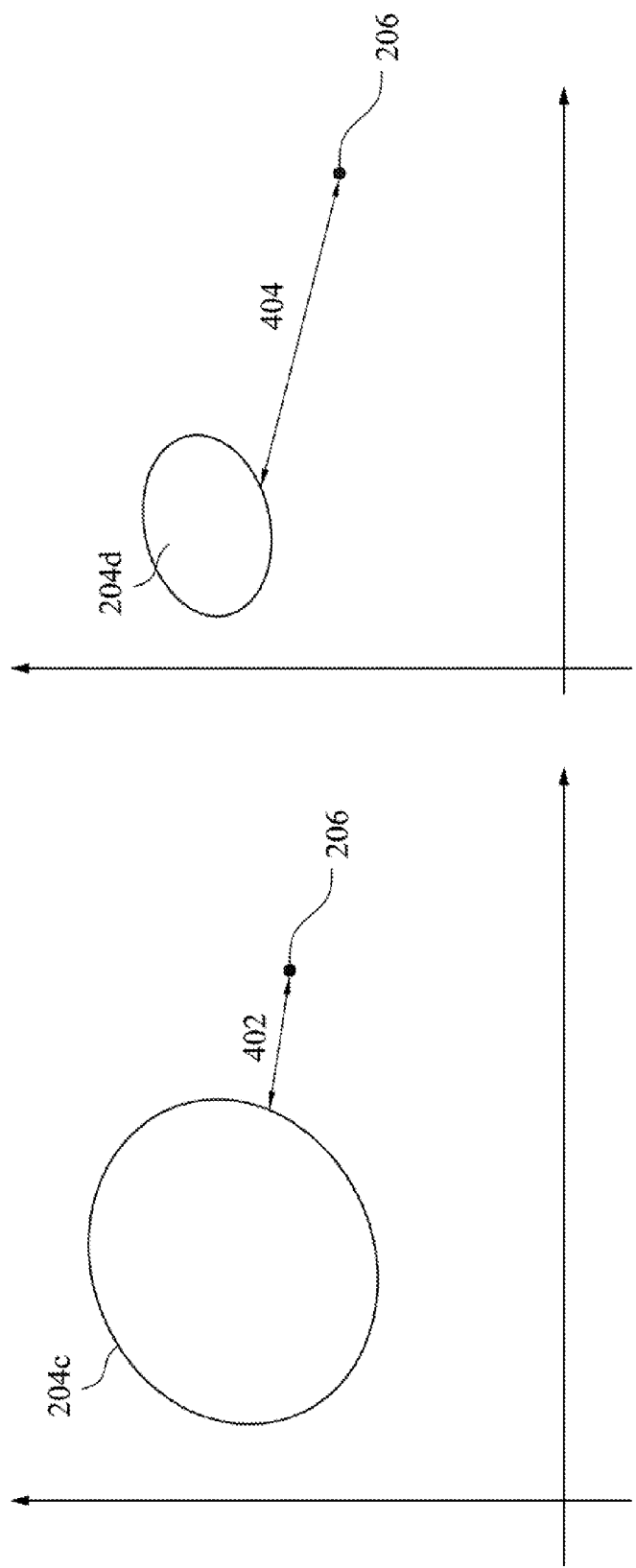
FIG. 4 is a schematic diagram of an accelerated comparison technique of the image correction system according to some embodiments of the present disclosure.

Reference is now made to FIG. 4. FIG. 4 is a schematic diagram of an accelerated comparison technique of the image correction system according to some embodiments of the present disclosure. As shown in FIG. 4, there are a distance 402 between the input gamut points 206 and a reference pattern 204c, and a distance 404 between the input gamut points 206 and a reference pattern 204d. In one embodiment, when the distance 402 is lower than a default distance threshold, it is necessary to further calculate out the correlation between the input pattern 202 and the reference pattern 204c since the input gamut points 206 are closer to the reference pattern 204c or located inside the reference pattern 204c. In contrast, when the distance 404 is higher than the default distance threshold, it is unnecessary to further calculate out the correlation between the input pattern 202 and the reference pattern 204d since the input gamut points 206 are farther from the reference pattern 204d. For example, the default distance threshold may be a default parameter in the image correction system 100. In one embodiment, the image correction system 100 can dynamically modify the default difference threshold according to the variation between the indoor illuminant and the outdoor illuminant.

In one embodiment, the processor 102 can select out a group of candidate reference patterns from the storage device 104 in advance, and the distance 402 between each of the reference patterns 204c in the group of the candidate reference patterns and the input gamut points 206 is lower than the default difference threshold. After the processor 102 selects out the group of the candidate reference patterns, the reference patterns 204d having farther distances from the input pattern 202 are therefore filtered. Subsequently, the processor 102 calculates out the correlations between the input pattern 202 and the reference patterns 204c in the group of the candidate reference patterns to generate the comparison result. In contrast, the processor 102 does not calculate out the correlations between the input pattern 202 and the reference patterns out of the group of the candidate reference patterns (i.e., the reference patterns 204d) to accelerate the correlation calculation between the input pattern 202 and the reference patterns 204. A detailed description of the correlation calculation has been provided above, and so will not be repeated.

Figure 5:
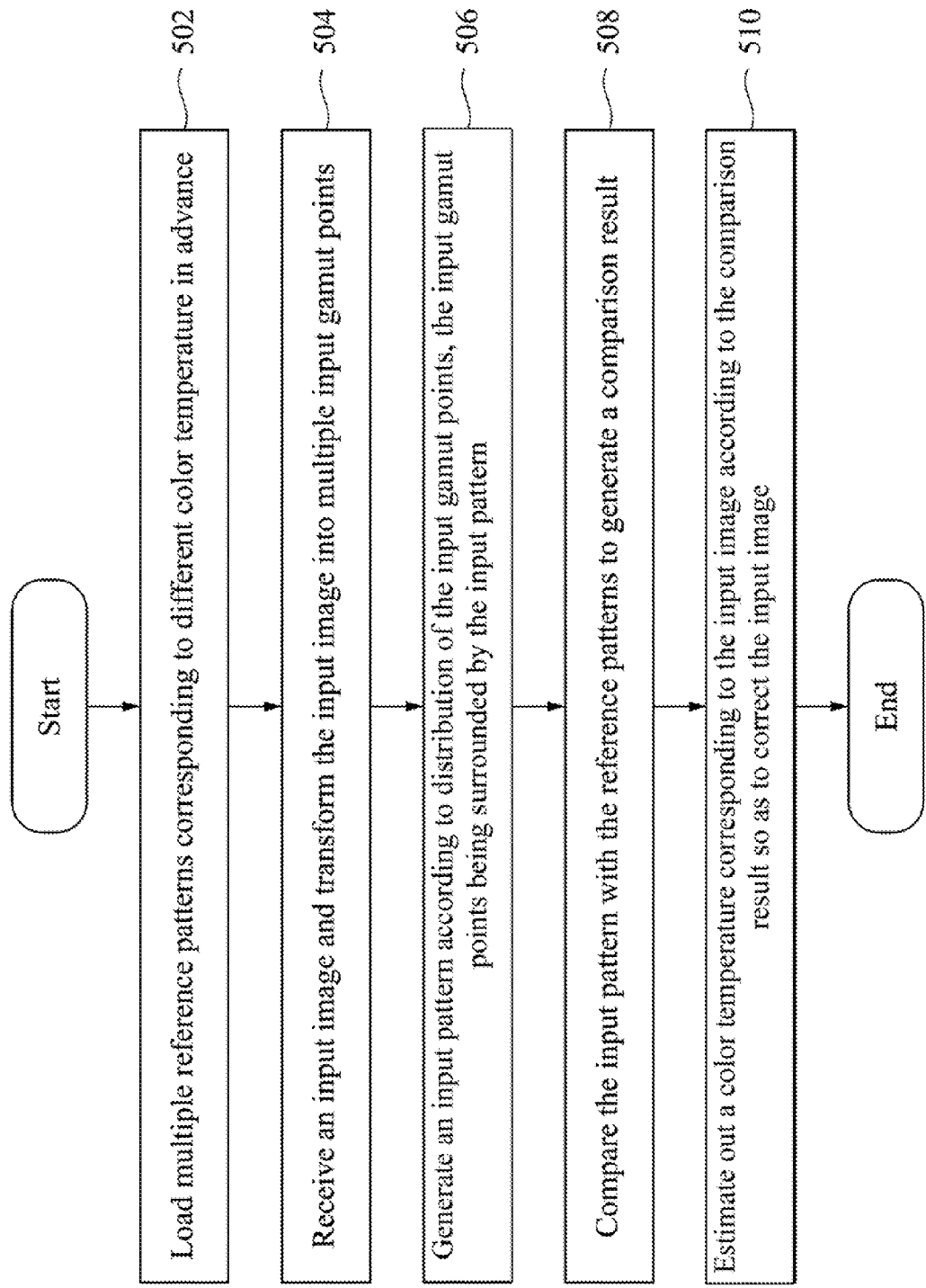
FIG. 5 is a flow chart of an image correction method according to some embodiments of the present disclosure.

Reference is now made to FIG. 5. FIG. 5 is a flow chart of an image correction method according to some embodiments of the present disclosure. In one embodiment, the image correction method can be adopted by the image correction system 100, but the present disclosure is not limited hereto. As shown in FIG. 5, firstly, in operation 502, the image correction system loads the reference patterns corresponding to the different color temperatures in advance to adopt the reference patterns as reference criteria for estimating the color temperature. In operation 504, the image correction system receives the input image, and transforms the input image into the input gamut points by the default functions. In operation 506, the image correction system generates the input pattern surrounding the input gamut points according to the distribution of the input gamut points. In operation 508, the image correction system compares the input pattern with the reference patterns to generate the comparison result. As an example, the input pattern and the reference patterns can be circles, ellipses, squares or rectangles. Finally, in operation 510, the image correction system estimates out the color temperature corresponding to the input image according to the comparison result, and then corrects the input image based on the estimated color temperature. In one embodiment, the image correction system corrects the input image based on the estimated color temperature, such as the white balance correction, color correction or any other image processing, technique relating to color temperatures.

In one embodiment, in operation 508, the method for the image correction system to compare the input pattern with the preloaded reference patterns includes the image correction system analyzing out intersection areas between the input pattern and each of the preloaded reference patterns, and calculating out the correlations between the input pattern and each of the preloaded reference patterns according to the number of the input gamut points located inside the intersection area and the number of the input gamut points located outside the intersection area.

In one embodiment, a method for the image correction system to calculate out the correlations includes calculating out a ratio or a deviation between the number of the input gamut points located inside the intersection area and the number of the input gamut points located outside of the intersection area or any other relation relating to the number of the input gamut points; and selecting out the reference pattern having the highest correlation with the input pattern, and adopting the foregoing reference pattern and the color temperature thereof as the comparison result to estimate out the color temperature of the input image.

As described above, the input image is transformed into the input gamut points and the input pattern correspondingly to estimate out the color temperature of the input image to execute the white balance correction for the input image. In one embodiment, the reference patterns represented by a small number of parameters are adopted as the reference criteria, so that storage for storing the reference criteria is dramatically reduced. Furthermore, the input image is transformed into the input gamut points surrounded by the input pattern to reduce the effect of noise on the color temperature estimation (i.e., a small number of noise gamut points does not easily affect the generation of the input pattern) and give a status of color utilization of the input image more intuitively (i.e., a density of the input gamut points gives the status of the color utilization of the input image).

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the present disclosure. In view of the foregoing, it is intended that the present invention cover modifications and variations of this present disclosure provided they fall within the scope of the following claims.

What is claimed is:

1. An image correction system, comprising:
a storage device configured to store a plurality of reference patterns corresponding to different color temperatures; and
a processor configured to execute operations of:
receiving an input image and correspondingly transforming the input image into a plurality of input gamut points;
generating an input pattern in accordance with distribution of the input gamut points, the input gamut points being surrounded by the input pattern;
comparing the input pattern with the reference patterns to generate a comparison result; and
estimating out a color temperature corresponding to the input image in accordance with the comparison result so as to correct the input image.

2. The image correction system of claim 1, wherein the operation of the processor for comparing the input pattern with the reference patterns to generate the comparison result comprises:
calculating out correlations between the input pattern and each of the reference patterns, and selecting out the reference pattern having the highest correlation with the input pattern from the reference patterns and a color temperature of the reference pattern having the highest correlation with the input pattern to generate the comparison result.

3. The image correction system of claim 2, wherein the operation of the processor for calculating the correlations between the input pattern and each of the reference patterns comprises:
analyzing out intersection areas between the input pattern and each of the reference patterns; and
calculating out the correlation in accordance with the number of the input gamut points located inside the intersection area and the number of the input gamut points located outside the intersection area.

4. The image correction system of claim 1, wherein the operation of the processor for comparing the input pattern with each of the reference patterns to generate the comparison result comprises:
selecting out a group of candidate reference patterns from the reference patterns in accordance with an area of the input pattern in advance, wherein differences between areas of each of the reference patterns in the group of the candidate reference patterns and the area of the input pattern are lower than a default difference threshold; and
comparing the input pattern with the group of the candidate reference patterns to generate the comparison result.

5. The image correction system of claim 1, wherein the operation of the processor for comparing the input pattern with each of the reference patterns to generate the comparison result comprises:
selecting out a group of candidate reference patterns from the reference patterns in accordance with the distribution of the input gamut points in advance, wherein distances between each of the reference patterns in the group of the candidate reference patterns and the input gamut points are lower than a default distance threshold; and
comparing the input pattern with the group of the candidate reference patterns to generate the comparison result.

6. The image correction system of claim 4, wherein the operation of the processor for comparing the input pattern with the group of the candidate reference patterns to generate the comparison result comprises:
calculating out correlations between the input pattern and each of the group of the candidate reference patterns, and selecting out the reference pattern having the highest correlation with the input pattern from the group of the candidate reference patterns and a color temperature of the selected reference pattern to generate the comparison result.

7. The image correction system of claim 5, wherein the operation of the processor for comparing the input pattern with the group of the candidate reference patterns to generate the comparison result comprises:
calculating out correlations between the input pattern and each of the group of the candidate reference patterns, and selecting out the reference pattern having the highest correlation with the input pattern from the group of the candidate reference patterns and a color temperature of the selected reference pattern to generate the comparison result.

8. The image correction system of claim 6, wherein the operation of the processor for calculating the correlations between the input pattern and each of the group of the candidate reference patterns comprises:
analyzing out intersection areas between the input pattern and each of the group of the candidate reference patterns; and
calculating out the correlation in accordance with the number of the input gamut points located inside the intersection area and the number of the input gamut points located outside the intersection area.

9. The image correction system of claim 7, wherein the operation of the processor for calculating the correlations between the input pattern and each of the group of the candidate reference patterns comprises:
analyzing out intersection areas between the input pattern and each of the group of the candidate reference patterns; and
calculating out the correlation in accordance with the number of the input gamut points located inside the intersection area and the number of the input gamut points located outside the intersection area.

10. The image correction system of claim 1, wherein the input pattern and the reference patterns are like patterns of circles or ellipses.

11. An image correction method, comprising:
loading a plurality of reference patterns corresponding to different color temperatures in advance;
receiving an input image and correspondingly transforming the input image into a plurality of input gamut points;
generating an input pattern in accordance with distribution of the input gamut points, the input gamut points being surrounded by the input pattern;
comparing the input pattern with the reference patterns to generate a comparison result; and
estimating out a color temperature corresponding to the input image in accordance with the comparison result so as to correct the input image.

12. The image correction method of claim 11, wherein comparing the input pattern with the reference patterns to generate the comparison result comprises:

calculating out correlations between the input pattern and each of the reference patterns, and selecting out the reference pattern having the highest correlation with the input pattern from the reference patterns and a color temperature of the reference pattern having the highest correlation with the input pattern to generate the comparison result.

13. The image correction of claim 12, wherein calculating out the correlations between the input pattern and each of the reference patterns comprises:
  analyzing out intersection areas between the input pattern and each of the reference patterns; and
  calculating out the correlation in accordance with the number of the input gamut points located inside the intersection area and the number of the input gamut points located outside the intersection area.

14. The image correction method of claim 11, wherein comparing the input pattern with each of the reference patterns to generate the comparison result comprises:
  selecting out a group of candidate reference patterns from the reference patterns in accordance with an area of the input pattern in advance, wherein differences between areas of each of the reference patterns in the group of the candidate reference patterns and the area of the input pattern are lower than a default difference threshold; and
  comparing the input pattern with the group of the candidate reference patterns to generate the comparison result.

15. The image correction method of claim 11, wherein comparing the input pattern with the reference patterns to generate the comparison result comprises:
  selecting out a group of candidate reference patterns from the reference patterns in accordance with the distribution of the input gamut points in advance, wherein distances between each of the reference patterns in the group of the candidate reference patterns and the input gamut points are lower than a default distance threshold; and
  comparing the input pattern with the group of the candidate reference patterns to generate the comparison result.

16. The image correction method of claim 14, wherein comparing the input pattern with the group of the candidate reference patterns to generate the comparison result comprises:
  calculating out correlations between the input pattern and each of the group of the candidate reference patterns, and selecting out the reference pattern having the highest correlation with the input pattern from the group of the candidate reference patterns and a color temperature of the selected reference pattern to generate the comparison result.

17. The image correction method of claim 15, wherein comparing the input pattern with the group of the candidate reference patterns to generate the comparison result comprises:
  calculating out correlations between the input pattern and each of the group of the candidate reference patterns, and selecting out the reference pattern having the highest correlation with the input pattern from the group of the candidate reference patterns and a color temperature of the selected reference pattern to generate the comparison result.

18. The image correction method of claim 16, wherein calculating out the correlations between the input pattern and each of the group of the candidate reference patterns comprises:
  analyzing out intersection areas between the input pattern and each of the group of the candidate reference patterns; and
  calculating out the correlation in accordance with the number of the input gamut points located inside the intersection area and the number of the input gamut points located outside the intersection area.

19. The image correction method of claim 17, wherein calculating out the correlations between the input pattern and each of the candidate reference patterns comprises:
  analyzing out intersection areas between the input pattern and each of the group of the candidate reference patterns; and
  calculating out the correlation in accordance with the number of the input gamut points located inside the intersection area and the number of the input gamut points located outside the intersection area.

20. The image correction method of claim 11, wherein the input pattern and the reference patterns are like patterns of circles or ellipses.

* * * * *